United States Patent [19]
Kim

[11] Patent Number: 6,152,389
[45] Date of Patent: Nov. 28, 2000

[54] FISHING REEL CLUTCH

[75] Inventor: Hyunkyu Kim, Broken Arrow, Okla.

[73] Assignee: Brunswick Corporation, Lake Forest, Ill.

[21] Appl. No.: 09/459,316

[22] Filed: Dec. 10, 1999

[51] Int. Cl.[7] .................................................. A01K 89/00
[52] U.S. Cl. ......................... 242/260; 242/298; 242/310; 242/312
[58] Field of Search .................................. 242/257, 260, 242/261, 262, 298, 310, 311, 312

[56] References Cited

U.S. PATENT DOCUMENTS

| | | | |
|---|---|---|---|
| 2,352,138 | 6/1944 | Torrence | 242/260 |
| 3,425,644 | 2/1969 | Griste | 242/298 |
| 3,478,979 | 11/1969 | Henze | 242/298 |
| 4,331,303 | 5/1982 | Moss | 242/311 |
| 5,333,812 | 8/1994 | Sato . | |
| 5,402,953 | 4/1995 | Sato . | |
| 5,429,318 | 7/1995 | Sato . | |
| 5,503,343 | 4/1996 | Hirano . | |
| 5,779,171 | 7/1998 | Milano, Jr. et al. | 242/257 |
| 5,921,491 | 7/1999 | Kim . | |
| 5,927,630 | 7/1999 | Katayama . | |
| 5,950,949 | 9/1999 | Cockerman | 242/288 |
| 5,996,920 | 12/1999 | Yamaguchi | 242/288 |

FOREIGN PATENT DOCUMENTS 6-05467  1/1994  Japan .

*Primary Examiner*—Donald P. Walsh
*Assistant Examiner*—Emmanuel M. Marcelo
*Attorney, Agent, or Firm*—Fellers, Snider, Blankenship, Bailey & Tippens

[57] ABSTRACT

A clutch assembly for a fishing reel. In one embodiment, the inventive clutch assembly comprises: a clutch shell having a cylindrical exterior wall; a clutch contained in the clutch shell; a reel cover having a cylindrical cavity provided therein for receiving the clutch shell; at least one tab provided on the clutch shell; and a corresponding number of recesses provided in the reel cover for receiving the tabs to substantially prevent the clutch shell from rotating within the cavity. In another embodiment, the inventive clutch assembly comprises: a clutch shell having a cylindrical exterior wall; a clutch contained in the clutch shell; a reel cover having a cylindrical cavity formed therein for receiving the clutch shell; at least one tab provided in the cavity; and a corresponding number of recesses provided in the clutch shell for receiving the tabs to substantially prevent the clutch shell from rotating in the cavity.

8 Claims, 3 Drawing Sheets

FISHING REEL CLUTCH

BACKGROUND OF THE INVENTION

1. Field of the Invention

This invention relates generally to clutch mechanisms for fishing reels. More particularly, but not by way of limitation, the present invention relates to one-way roller clutches for baitcast fishing reels.

2. Background

Many types of fishing reels employ one-way clutch structures to prevent backward rotation of the crank handle. One-way clutches are well known in the art under a variety of common names such as roller clutches, overrun clutches, and sprag clutches. For casting, a thumb-operated mechanism or other means is typically provided for releasing the clutch to allow free rotation of the spool in the unwinding direction. Baitcasting-type reels commonly employ one-way roller clutches to prevent backward rotation while desirably minimizing the amount of free play in the crank handle.

In a baitcasting reel having a metal side cover, a cylindrical, one-way clutch will typically be pressed directly into a boss provided on the side cover such that the clutch body is prevented from rotating. In baitcasting reels with plastic side covers, one-way clutches are typically first pressed into shells having non-circular (e.g., hexagonal) cross sections. The shell and clutch combination is then inserted into an appropriately shaped aperture provided in the side cover, thus preventing rotation of both the shell and the clutch body.

In a typical baitcasting reel, the crankshaft of the reel will extend through the one-way clutch such that, when the crank handle is turned in the forward direction, the clutch overruns, thereby allowing free rotation of the crank handle. However, when the crank handle is turned in the opposite direction, the clutch will engage and grip the crankshaft, thus preventing rotation in the reverse direction.

Unfortunately, a number of problems are common in fishing reels which employ clutches pressed into non-cylindrical (e.g., hexagonal) shells. In using such devices, it is difficult and costly to achieve the degree of precision necessary to minimize free play between the non-cylindrical shell and the corresponding aperture provided in the side cover of the reel. It is also difficult to maintain the required alignment between the centerline of the crankshaft and the centerline of the one-way clutch.

A further disadvantage of at least some previous designs is that they do not eliminate the possibility of backward installation of the clutch in the side cover.

Thus it is an object of the present invention to provide and allow the use of a one-way clutch shell which is generally of a cylindrical shape.

It is another object of the invention to provide a means for securing the shell against rotation while maintaining an acceptable minimal level of free play.

It is another object of the invention to provide a means for ensuring that the shell is properly oriented within the side cover.

SUMMARY OF THE INVENTION

These and other objects are achieved in a fishing reel including a one-way clutch which has or is pressed into a cylindrical shell, the shell having an outer cylindrical surface which is slidingly received in a corresponding cylindrical cavity provided in the side cover of the reel. In one embodiment of the present invention, the shell includes at least one tab receivable in a recess provided in the side cover of the fishing reel for securing the shell against rotation. In another embodiment of the present invention, the side cover cavity includes at least one interior tab receivable in a recess provided in the clutch shell.

DETAILED DESCRIPTION OF THE PREFERRED EMBODIMENTS

Figure 1:
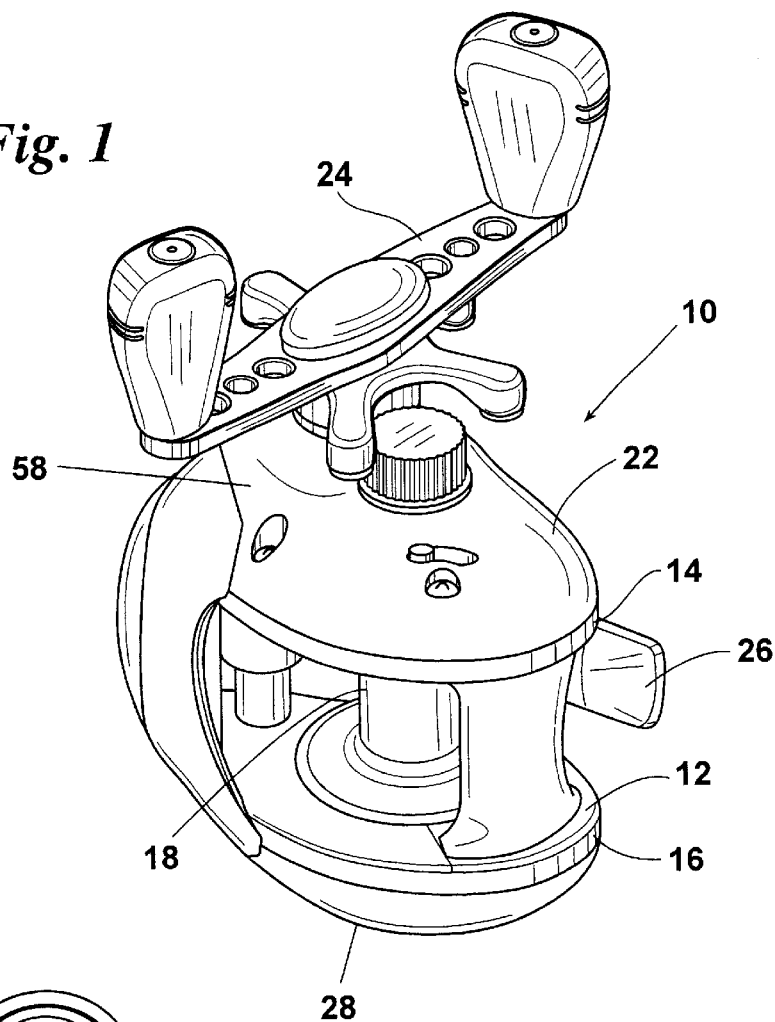
FIG. 1 provides a perspective right rear view of a baitcasting reel 10 having the inventive clutch assembly installed therein.

Before explaining the present invention in detail, it is important to understand that the invention is not limited in its application to the details of the construction and the steps described herein. The invention is capable of other embodiments and of being practiced or carried out in a variety of ways. It is to be understood that the phraseology and terminology employed herein is for purpose of description and not of limitation.

Referring now to FIGS. 1–4, wherein like reference numerals designate identical or corresponding parts throughout the several views, there is shown a baitcasting reel 10 incorporating a preferred embodiment of the one-way clutch and shell. Baitcasting reel 10 comprises: a frame 12 having a right side plate 14 and a left side plate 16; a line spool 18 rotatably mounted in frame 12 between side plates 14 and 16; a right side cover 22 secured over right side plate 14; a crank handle 24, operably extending from right side cover 22, for rotating spool 18; a reel foot 26 provided on the bottom of frame 12 for attaching reel 10 to a fishing rod; and a left side cover 28 secured over left side plate 16.

As will be readily understood by those skilled in the art, baitcast reel 10 also includes numerous other components and features which are commonly employed in reels of this type but are not relevant to the present invention. Moreover, although the inventive apparatus is herein described as incorporated in a right-handed baitcasting reel, the inventive apparatus is equally adaptable for use in left-handed baitcasting reels, as well as other types of fishing reels.

Included in the right side of reel 10 is a crankshaft assembly 34. Crankshaft assembly 34 preferably comprises: a crankshaft 40; an inventive clutch assembly 56 retained in an open boss 58 projecting from right side cover 22; and a clutch sleeve 60 received in clutch assembly 56. Crank handle 24 is secured on the exterior end of crankshaft 40. Clutch sleeve 60 is keyed or otherwise secured on crankshaft 40 such that sleeve 60 and crankshaft 40 are prevented from rotating independently of each other.

Inventive clutch assembly 56 preferably comprises a one-way roller clutch 122 which has or is pressed into a cylindrical shell 124. Thus, for example, shell 124 could be either (a) the outer race/housing of the clutch or (b) a separate structure into which the outer race/housing 125 of the clutch is press fit. Shell 124 includes tabs 126 which extend radially outward from the outer longitudinal end of the cylindrical exterior wall 128 of the shell. As shell 124 is inserted into the cylindrical cavity 62 provided in cover boss 58, tabs 126 are received in corresponding recesses 130 formed in cover 22. Although six tabs 126 are shown, any number of tabs 126 could be used.

The placement of tabs 126 in recesses 130 secures shell 124 against rotation. Recesses 130 are preferably sized and shaped to substantially prevent any rotational movement of tabs 126, thereby minimizing the amount of free play introduced to the crank handle by the inventive clutch assembly 56.

As will also be apparent, the configuration and location of tabs 126 ensure that clutch assembly 56 will always be properly oriented (i.e., inner end first) in side cover 22. The receipt of tabs 126 in recesses 130 also holds clutch assembly 56 against further longitudinal movement into side cover 22.

Figure 5:
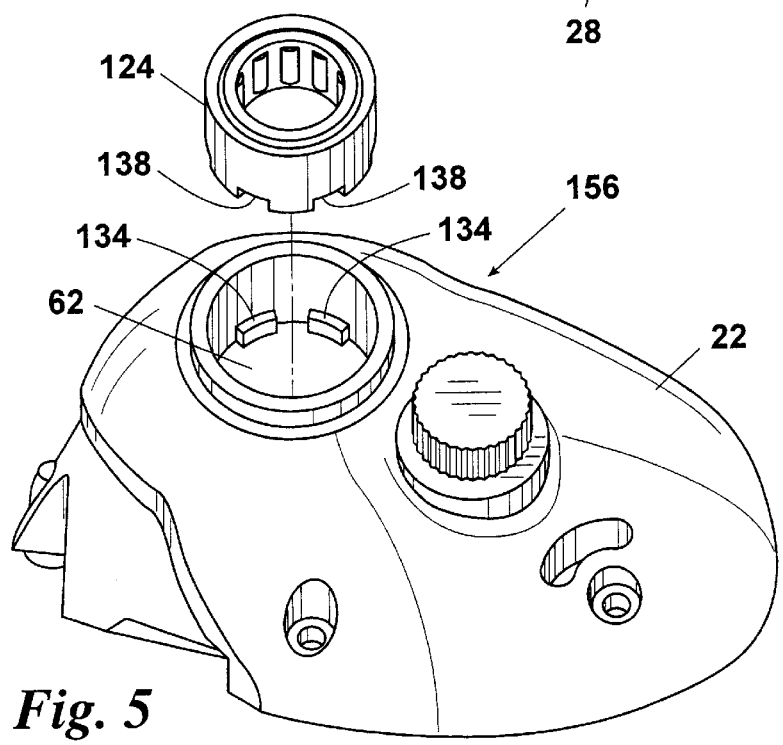
FIG. 5 provides a partially exploded top perspective view of side cover 22 having an alternative embodiment 156 of the inventive clutch assembly installed therein.
Figure 2:
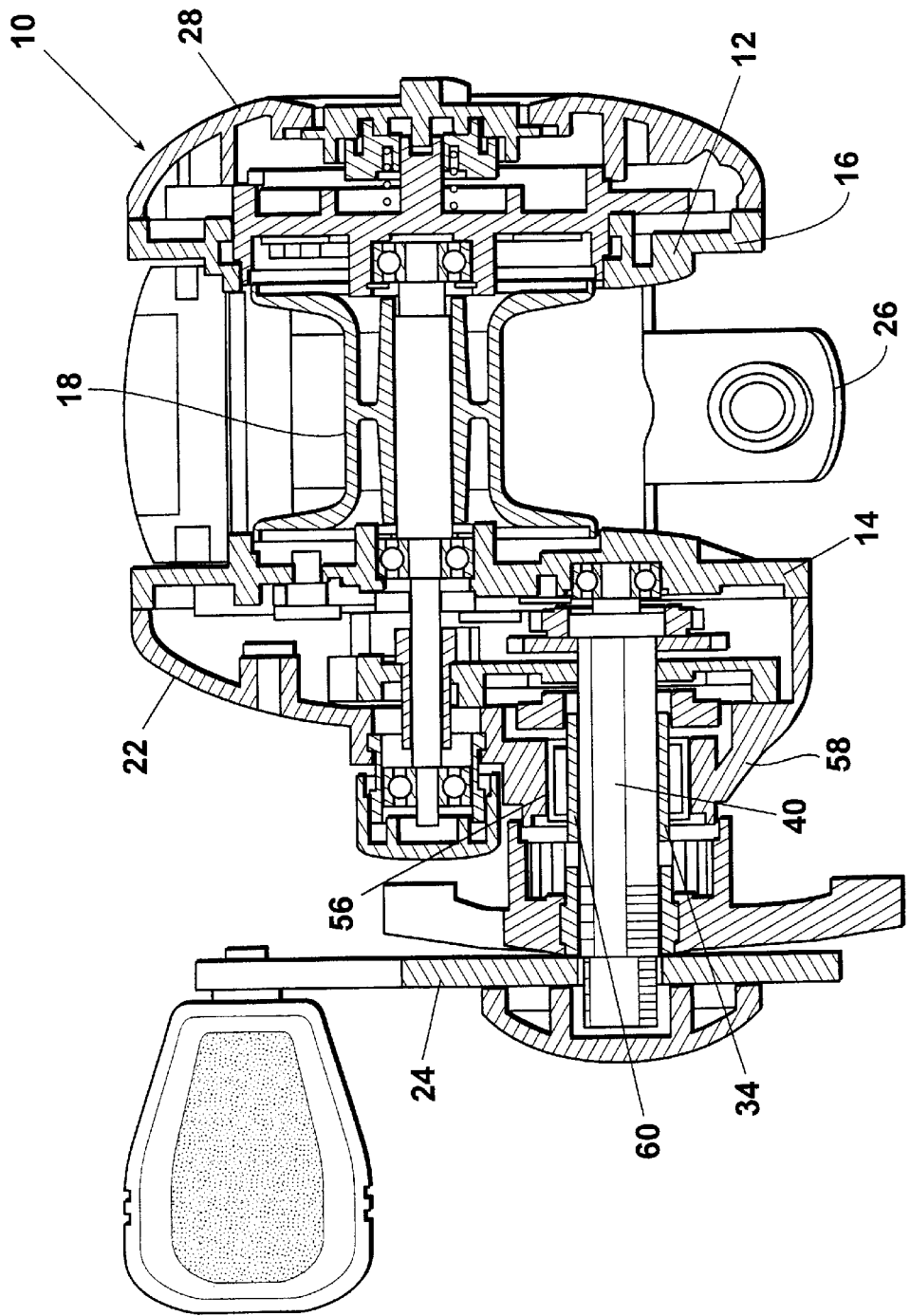
FIG. 2 provides a cutaway elevational front view of baitcasting reel 10.
Figure 3:
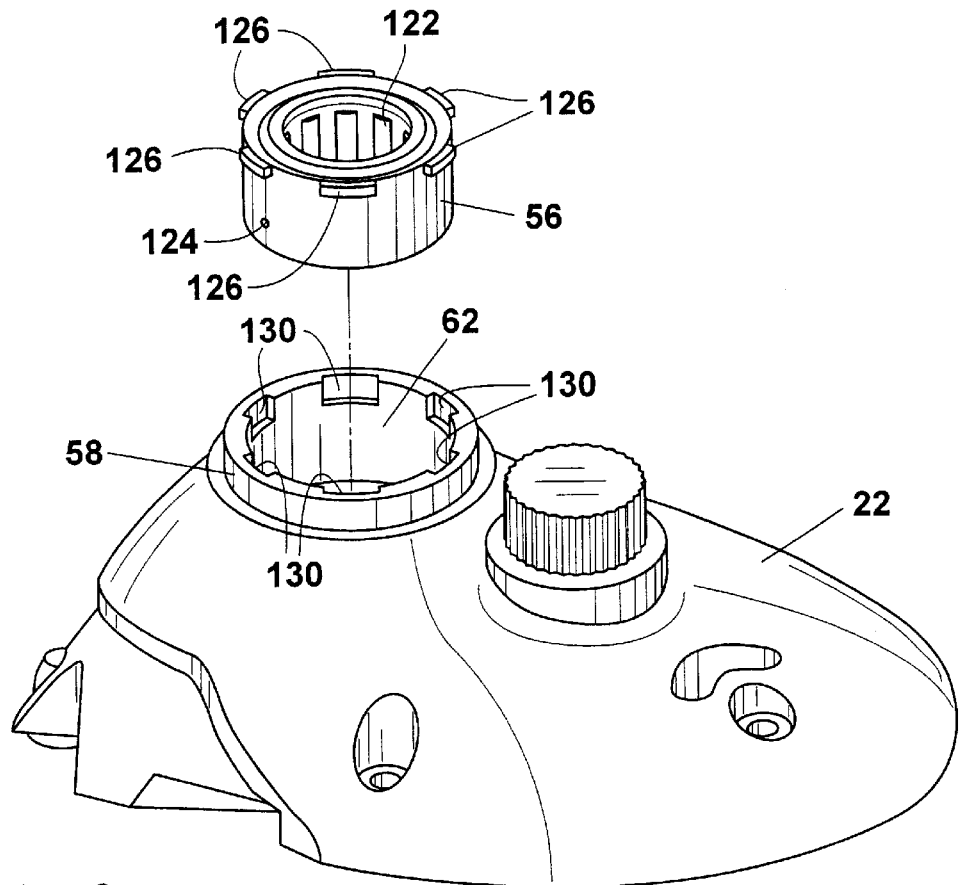
FIG. 3 provides a partially exploded top perspective view of the right cover 22 of reel 10 having inventive clutch assembly 56 installed therein.
Figure 4:
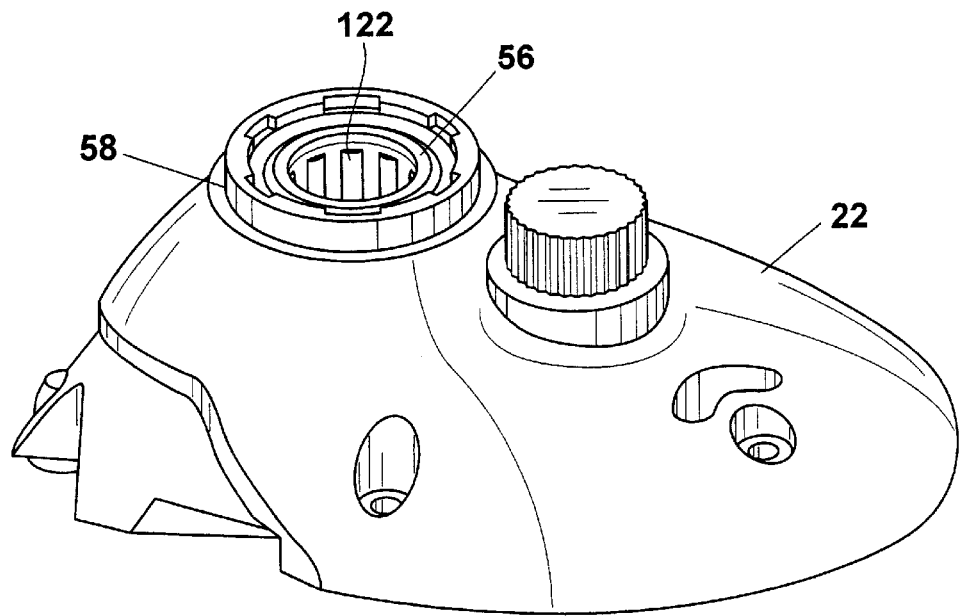
FIG. 4 provides a top perspective view of side cover 22 having inventive clutch assembly 56 installed therein.

In an alternative embodiment 156 of the inventive clutch assembly is depicted in FIG. 5. In the alternative embodiment, inwardly projecting tabs 134 are provided at the interior end of cover cavity 62. Tabs 134 are received in notches 138 formed in the inner longitudinal end of clutch shell 124. Again, tabs 134 secure clutch shell 124 against rotation, prevent improper orientation, and hold clutch assembly 156 against further longitudinal movement into side cover 22.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A clutch assembly for a fishing reel comprising:
   a clutch shell having a cylindrical exterior wall;
   a clutch contained in said clutch shell;
   a reel cover having a cylindrical cavity provided therein for receiving said clutch shell;
   at least one tab provided on said clutch shell; and
   a corresponding number of recesses provided in said reel cover for receiving said tabs to substantially prevent said clutch shell from rotating within said cavity.

2. The clutch of claim 1 wherein said tab is positioned on said clutch shell such that said tab prevents said clutch shell from being improperly oriented in said cavity.

3. The clutch assembly of claim 1 wherein said clutch shell has an outer longitudinal end and an inner longitudinal end and said tab projects radially outward from said outer end of said clutch shell.

4. The clutch assembly of claim 1 comprising a plurality of said tabs.

5. A clutch assembly for a fishing reel comprising:
   a clutch shell having a cylindrical exterior wall;
   a clutch contained in said clutch shell;
   a reel cover having a cylindrical cavity provided therein for receiving said clutch shell;
   at least one tab provided in said cavity; and
   a corresponding number of recesses provided in said clutch shell for receiving said tabs to substantially prevent said clutch shell from rotating in said cavity.

6. The clutch assembly of claim 5 wherein said tab is positioned in said cavity such that said tab prevents said clutch shell from being improperly oriented in said cavity.

7. The clutch assembly of claim 5 wherein said clutch shell has an outer longitudinal end and an inner longitudinal end and said recesses are provided in said inner longitudinal end.

8. The clutch assembly of claim 5 comprising a plurality of said tabs.

* * * * *